United States Patent
Sinegribov et al.

(10) Patent No.: US 7,846,234 B2
(45) Date of Patent: Dec. 7, 2010

(54) METHOD OF PRECIOUS METAL RECOVERY

(76) Inventors: Viktor Andreevich Sinegribov, ul.Flotskaya, 98-64, Moscow (RU) 125413; AndreiFilippovich Smetannikov, ul. Koroleva, 12-28, Perm (RU) 614061; TatyanaBorisovna Udina, ul. Yasenevskaya, 21-2-9, Moscow (RU) 115583; PavelUrievich Novikov, ul. Gvardeiskaya, 14-218, Moscow (RU) 121471; Izabella Alekseevna Logvinenko, ul.Moskoverchie, 49-25, Moscow (RU) 115409; ArkadiyEvgenievich Krasnoshtein, ul. Shvetsova, 45-24, Perm (RU) 614039

( * ) Notice: Subject to any disclaimer, the term of this patent is extended or adjusted under 35 U.S.C. 154(b) by 182 days.

(21) Appl. No.: 12/087,446

(22) PCT Filed: Jan. 9, 2007

(86) PCT No.: PCT/RU2007/000004
§ 371 (c)(1),
(2), (4) Date: Jul. 7, 2008

(87) PCT Pub. No.: WO2007/081243
PCT Pub. Date: Jul. 19, 2007

(65) Prior Publication Data
US 2009/0007729 A1      Jan. 8, 2009

(30) Foreign Application Priority Data
Jan. 10, 2006   (RU) ................ 2006100779

(51) Int. Cl.
*C22B 11/06*   (2006.01)
(52) U.S. Cl. .................... 75/421; 423/27; 423/34; 423/40

(58) Field of Classification Search ............ 75/421; 423/27, 34, 40
See application file for complete search history.

(56) References Cited

U.S. PATENT DOCUMENTS

| 3,958,985 A | * | 5/1976 | Anderson | ............... 75/426 |
| 5,074,910 A | | 12/1991 | Dubrovsky | |
| 2004/0081602 A1 | * | 4/2004 | Han et al. | ............... 423/22 |

FOREIGN PATENT DOCUMENTS

| CA | 992329 | * | 7/1976 |
| CA | 1228989 | | 11/1987 |
| RU | 2113526 | | 6/1998 |
| RU | 2213793 | | 10/2003 |
| RU | 2235140 | | 8/2004 |
| WO | WO02/053788 | | 7/2002 |
| WO | WO 2005007903 A1 | * | 1/2005 |

* cited by examiner

*Primary Examiner*—George Wyszomierski
*Assistant Examiner*—Tima M McGuthry-Banks
(74) *Attorney, Agent, or Firm*—Aleksandr Smushkovich

(57) ABSTRACT

The proposed invention relates to methods of precious metal recovery and may be applied to the recovery of precious metals from various types of mineral raw source materials containing chlorides of alkali and earth metals, e.g. collective concentrate produced from clay-salt residue of potassium production, or marker clays, etc. This method includes chlorinating roasting of the collective concentrate produced during enrichment of the material with residual chlorides content of 7-13%, or natural concentrate with up to 15% chlorides content. Thereafter, the cinder is leached by an aqua-regia solution, the precious metals are recovered from the pulp via of sorption, chlorinating roasting is held at 600-700° C., the precious metals are leached from the cinder using diluted solution of aqua-regia, and then via sorption. The process is cost-efficient due to the use of chlorinating agent, reduction of the process steps number, decreasing of the roasting temperature, and the leaching by diluted acid.

1 Claim, No Drawings

METHOD OF PRECIOUS METAL RECOVERY

CROSS-REFERENCE TO RELATED APPLICATIONS

This application is a U.S. national phase application of a PCT application PCT/RU2007/000004 filed on 9 Jan. 2007, published as WO2007/081243, whose disclosure is incorporated herein in its entirety by reference, which PCT application claims priority of a Russian Federation patent application RU2006/100779 filed on 10 Jan. 2006.

FIELD OF THE INVENTION

This invention relates to methods for precious metal recovery and may be applied to recover precious metals (e.g. platinum, palladium, gold, etc.) from various types of mineral raw materials containing chlorides of alkali and earth metals, like collective concentrate produced from clay-salt residues (slimes) of potassium production, or marker clays, etc.

BACKGROUND OF THE INVENTION

According to one of the known methods of potassium pulp processing (Russian Federation Patent # 2132397 RF, MPK S 22 V7/00, published on Jun. 6, 1999), gold-containing pulp is cleaned of salts, after which the salt water formed during cleaning is removed and replaced by fresh water, and the final pulp is chlorinated by chlorine gas while care is taken to ensure that active chlorine content in leaching solution is maintained within 0.3-2.0 g/l. After the leaching, the process is completed, gold is recovered by a sorption method.

The disadvantages of the above method include the need to thoroughly clean the chlorides and use elemental chlorine, a high toxic substance, for gold recovery.

According to another known method of processing of clay-salt pulp at salt chloride production facilities (Russian Federation Patent # 2208058 RF, MPK S 22 V11/00, 7/00, published on Jul. 10, 2003), slimes are cleaned of chlorides until residual chlorine content is within 3-7%, after which the cleaned pulp undergoes concentration, drying, agglomeration and continuous heat-treatment at up to 1000-1150° C. while the content of oxygen in heat-treatment gas is maintained within 13-16%, until the final material is produced with maximum chlorine content of 0.3%. The gaseous phase of the heat treatment process is treated by cooling, condensation and absorption cleaning, which includes the recovery of condensates of solid-state chlorides and absorption pulp, and further sorption of gold and silver from pulp.

The disadvantages of the above method are as follows:
1) High power inputs due to conducting of the roasting process at 1000-1150° C.
2) The process of sublimation of gold and silver chlorides at oxidizing conditions does not affect platinoids, and they (platinoids) continue to remain in the cinder.
3) Catching of gold and silver sublimates is complicated and inefficient due to low content of gold and silver in the gaseous phase.

From the technical viewpoint, the closest to the instant invention is the method for precious metal recovery from a concentrate produced from clay-salt residues (slimes) of potassium production (Russian Federation Patent # 2235140, MPK S22V 11/00, published on Aug. 27, 2004], which includes the oxidizing roasting of the concentrate and cinder acid-leaching, wherein prior to the roasting of the concentrate is mixed up with sodium chloride and pyrite at 1:(0.1-0.2):(0.1-0.2) ratio. The oxidizing roasting of the fusion mixture is carried out at 450-600° C. for 1-5 hours, whereas the cinder leaching is achieved by using a diluted hydrochloric or sulphuric acid, and transferring of gold and platinum metals to the solution.

The disadvantages of the above method include insufficient precious metal recovery ratio and high power input in the process.

SUMMARY OF THE INVENTION

The proposed invention resolves the issue of cost-efficient and complete recovery of precious metals from mineral raw materials containing chlorides of alkali and earth metals, like collective (bulk) concentrate produced from clay-salt residue (slimes) of potassium production, or marker clays, etc.

In order to achieve the above results, the inventive method of recovery of precious metals from mineral raw materials containing chlorides of alkali and earth metals is proposed, comprising a chlorinating roasting of the mineral raw materials with production of a cinder, leaching the cinder, and sorption of the precious metals, wherein: (a) the chlorinating roasting of the mineral raw materials is carried at 600-700° C.; (b) the cinder leaching is carried out by using a diluted solution of aqua-regia ($HNO_3$+HCl) resulting in production of pulp; (c) the sorption of the precious metals is carried out from [[on]] the resulting pulp; and (d) the mineral raw materials, subjected to the chlorinating roasting, contains 7-13% of the total chlorides of alkali and earth metals.

The above specified (a)-(d) conditions form the distinctive features, which make the proposed method different from the method earlier described as "the closest" from the technical viewpoint.

Availability of the above features of the inventive method ensures a complex recovery of gold, silver and platinum metals from the mineral raw materials such as clay-salt residues (slimes) of the potassium production, containing chlorides of alkali and earth metals. Cost-efficiency of the process is improved due to the use of a chlorinating agent contained therein, reduction of the number of process steps (avoiding the fusion-mixing with the chlorinating agent), decreasing the firing temperature compared to that of the prototype, and leaching the precious metals from the cinder by using diluted acid.

PREFERRED EMBODIMENTS OF THE INVENTION

The proposed method is based on the following.

Concentrate to be used for the roasting and further treatment is produced by means of enrichment of the initial mineral raw materials, containing chlorides of alkali and earth metals (clay-salt waists of potassium-producing facilities), with a maximum residual K and Na content of 7-13% and a maximum moisture content of 5%. Natural concentrate (marker clays) can also be used provided that it has been previously ground, that its sodium salts content does not exceed 15% and the maximum residual moisture is 5%.

Where the content of chlorides in the mineral raw materials exceeds 13%, the inventive method initially comprises: subjecting the mineral raw materials to enrichment, washing off excess chlorides from the enriched materials, drying the enriched materials, and forwarding the dried enriched materials to the chlorinating roasting.

As a result of the roasting, organic compounds, contained in the mineral raw materials are oxidized, and the precious metals are released and chlorinated. The resulting cinder is leached using a diluted solution of aqua-regia to recover soluble salts of the precious metals, and salts of alkali and earth metals, aluminum, iron and other metals, after which the precious metals are recovered from the pulp by means of sorption, e.g. using the AM-2B resin.

Table 1 provides data on precious metal recovery based on a direct (roast-free) leaching of three samples of the slimes (an initial sample and two samples of partially cleaned from chlorides) by using a 3.8-normal solution of aqua-regia at a solid-to-liquid ratio (S:L)=1:4 and 65-70° C. for 4 hours, and sorption of the precious metals using the AM-2B anionite, and analysis of the resin on the content of precious metals.

TABLE 1

Precious metal recovery in the end solution

| Chlorides content*, % | Recovery, g/t | | | |
|---|---|---|---|---|
| | Pt | Pd | Au | Ag |
| 50.9 | <0.032 | 1.45 | 0.76 | 1.17 |
| 32.2 | <0.026 | 0.34 | 0.26 | 0.42 |
| 5.6 | <0.015 | 0.14 | 0.25 | 0.32 |

*Total Na, K and Mg chlorides in source sample

The cinder leaching is carried out at an (S:L)=1:4 ratio. A higher consumption of the leaching solution is not advisable due to low content of the precious metals in the leaching solution, which makes it difficult to recover these metals during the solution processing. If, pursuing to increase the content of the precious metals, the S:L ratio is reduced, then, after the solution is cooled down, the salt crystallization process, resulting from high salt concentration (see Table 2), takes place, which crystallization process complicates the process of sorption.

A low content of the precious metals in the solution produced by means of the cinder leaching, and a poor pulp condensability and filterability determine the selection of sorption of the precious metals from the pulp as an optimal way of its further treatment.

TABLE 2

Content of precious metal impurities in leaching solutions

| Content of chlorides in pulp, % | $t_{roast}$, °C. | Content in solution, g/dm³ | | | | | |
|---|---|---|---|---|---|---|---|
| | | Na | K | Mg | Ca | Al | Fe |
| 12.8 | 500 | 3.16 | 4.96 | 5.0 | 5.62 | 2.3 | 6.6 |
| | 600 | 2.54 | 5.03 | 5.52 | 5.12 | 3.1 | 4.5 |
| | 700 | 2.2 | 6.61 | 4.25 | 5.12 | 3.8 | 2.23 |
| | 800 | 1.94 | 6.17 | 3.12 | 5.93 | 10.4 | 3.8 |
| 7.2 | 500 | 1.62 | 3.8 | 6.1 | 7.3 | 2.47 | 5.5 |
| | 600 | 1.85 | 3.59 | 5.9 | 7.0 | 3.5 | 6.35 |
| | 700 | 1.45 | 6.52 | 4.7 | 5.94 | 3.2 | 2.6 |
| | 800 | 1.28 | 5.14 | 3.7 | 5.9 | 3.0 | 2.3 |

Table 3 shows the results of precious metal recovery after the roasting of a 7.2-12.8% chloride-containing pulp at 500-800° C., followed by the cinder leaching and processing of the resulting pulp at the conditions above specified. In case of a 12.8% chlorides content in the slimes, the maximal and stable recovery of palladium (approximately 4.5 G/T, which is far higher than in the case of using the leach method for un-roasted material), platinum, and gold has been achieved after the roasting at 500-700° C., whereas in case of 7.2% chlorides content, the optimal temperature range has narrowed to 600-700° C.

TABLE 3

Precious metal recovery after pulp roasting

| Clorides content*, % | $t_{roast}$, °C. | Recovery, G/T | | | | |
|---|---|---|---|---|---|---|
| | | Pt | Pd | Au | Ag | Cu |
| 12.8 | 500 | 0.20 | 4.64 | 0.08 | 5.56 | 1.26 |
| | 600 | 0.10 | 2.08 | 0.12 | 7.82 | 0.83 |
| | 700 | 0.16 | 4.40 | 0.08 | 5.75 | 0.96 |
| | 800 | 0.08 | 0.46 | 0.03 | 6.69 | 22.6 |
| 7.2 | 500 | <0.004 | 0.3 | <0.004 | 1.0 | 3.56 |
| | 600 | 0.58 | 5.86 | 0.04 | 1.51 | 2.00 |
| | 700 | 0.83 | 3.41 | 0.06 | 4.3 | 2.1 |
| | 800 | 0.28 | 0.51 | 0.29 | 7.80 | 1.61 |

The rate of silver recovery in the first case is similar within the roasting temperature range of 500-800° C., whereas in the second case it strongly depends on temperature and reaches the maximum level at 800° C.

Based on the multiple analyses findings, following the roasting of minerals with 12.8% chlorides content at 500-800° C., only 5.3-6.3% of the total sodium chlorides and potassium chlorides have reacted with mineral raw materials contained in the slimes to form chlorides of precious metals, magnesium, potassium, calcium, iron, aluminum, etc. The remaining 5.7-6.7% have been transferred into the leaching solution. A higher content of chlorides in the processed material will lead to an increase of the cost of roasting and will complicate the cinder processing due to the need of leaching of the excess chlorides.

Thusly, the optimal temperature range of the chlorinating roasting of the slimes with 7-13% chlorides content is 600-700° C.

Technical efficiency of the proposed method for precious metal recovery from mineral raw materials (concentrate produced from clay-salt residue of potassium production, or marker clays), containing chlorides of alkali and earth metals, is associated with a complex recovery of metals of platinum group, and gold and silver. Cost-efficiency improvement is achieved due to the use of chlorinating agent contained in the raw material, reduction of the number of process steps (the avoiding of mixing with the chlorinating agent), decreasing of the roasting temperature compared to the prototype, and leaching of the precious metals from the cinder by a diluted acid solution.

While the invention may be susceptible to embodiment in different forms, there are disclosed in detail hereinabove, specific embodiments of the present invention, with the understanding that the present disclosure is to be considered an exemplification of the principles of the invention, and is not intended to limit the invention to that as illustrated and described herein.

The invention claimed is:

1. A method for precious metal recovery from mineral raw materials containing chlorides of alkali and earth metals, said method comprising the steps of:
   providing a chlorinating roasting of said mineral raw materials carried at 600-700° C. with production of a cinder;
   leaching the cinder by using a diluted solution of aqua-regia ($HNO_3$+HCl) resulting in production of pulp; and
   providing sorption of said precious metals carried out from said pulp;
wherein the content of chlorides in said mineral raw materials exceeding 13%;

said method initially comprising the preliminary steps of:
  subjecting said mineral raw materials to enrichment,
  washing off excess chlorides from the enriched materials,
  drying said enriched materials, and
  subjecting the dried enriched material to said chlorinating roasting.

* * * * *